July 2, 1929.  H. V. REED  1,719,623
DRIVEN PLATE FOR FRICTION CLUTCHES
Filed May 2, 1927

Inventor
Harold V. Reed
By Wm O Bell Atty.

Patented July 2, 1929.

1,719,623

UNITED STATES PATENT OFFICE.

HAROLD V. REED, OF CHICAGO, ILLINOIS, ASSIGNOR TO THE BORG & BECK COMPANY OF CHICAGO, ILLINOIS, A CORPORATION OF ILLINOIS.

DRIVEN PLATE FOR FRICTION CLUTCHES.

Application filed May 2, 1927. Serial No. 188,179.

This invention relates to friction clutches of the kind wherein a friction plate driven member is interposed between two parts of a driving member and is adapted to be gripped or clamped by the parts under sufficient pressure to impart motion from the driving member to the driven member.

The object of the invention is to provide a flexible driven plate for friction clutches which will absorb the noises due to periodic vibrations of the engine and prevent them from being carried forward to the transmission where they would become audible and objectionable.

Another object of the invention is to provide a driven plate which is capable of torsional flexibility within itself to absorb vibration and other noises emanating from the engine with which the clutch embodying the driven plate is mechanically connected.

A further object of the invention is to provide a driven plate which will reduce spinning movement and thereby facilitate shifting of gears.

And a further object of the invention is to interpose a yielding cushion between two parts of a driven plate for friction clutches and to prevent this cushion from being tensioned during service of the clutch whereby to prolong its life.

Figure 1:
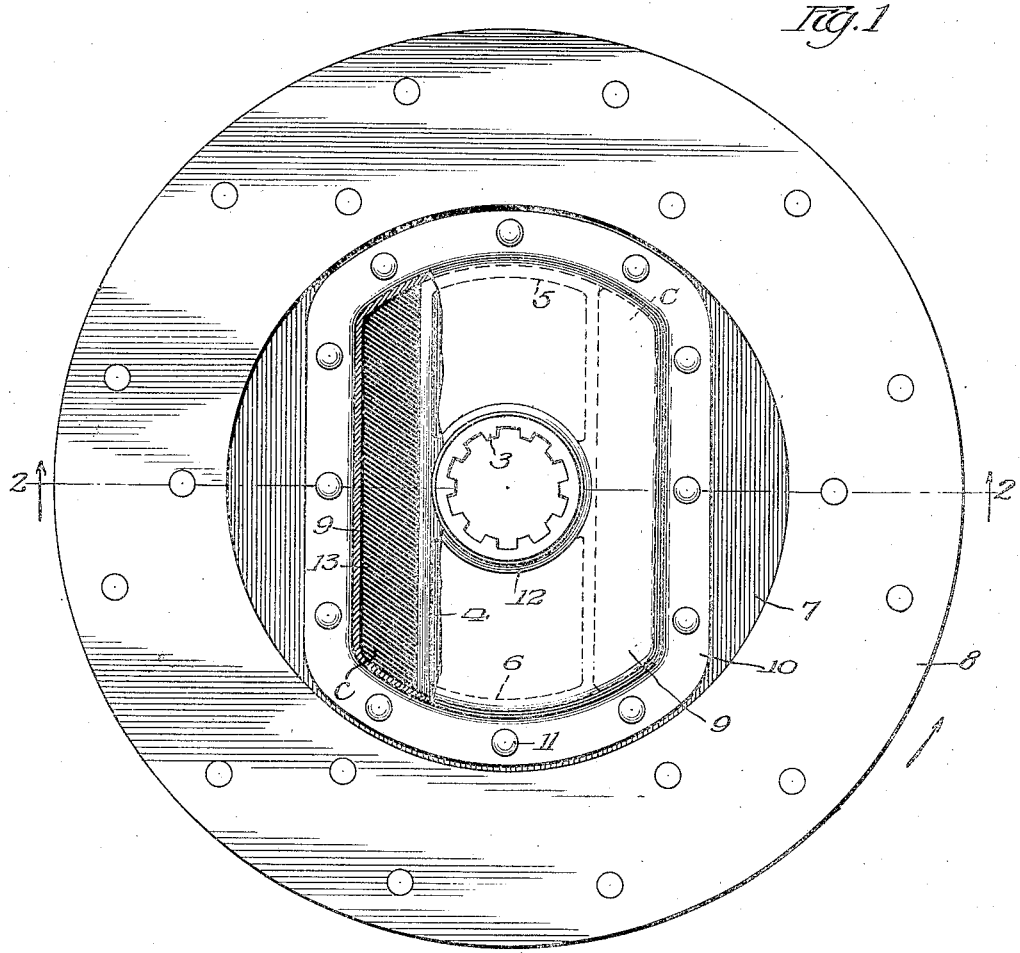
Figure 2:
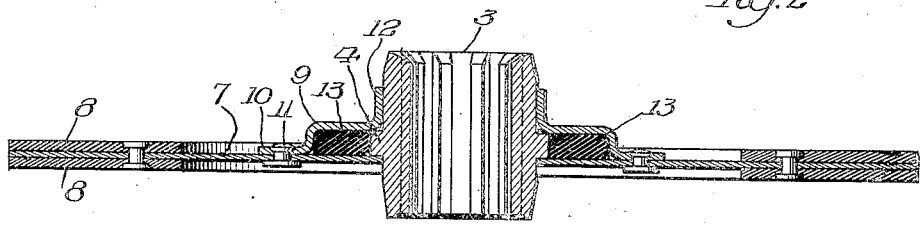

In the accompanying drawings illustrating a selected embodiment of the invention:

Fig. 1 is an elevation of the driven plate, partly broken away and partly in section, and Fig. 2 is a sectional view on the line 2—2 of Fig. 1.

Referring to the drawings the driven plate comprises a friction member which is mounted upon a centrally disposed hub member and a compressible cushion interposed between said members so that movement of the friction member is communicated through the cushion, and by compression only thereof, to the hub member. The hub member comprises a hub 3 having an integral flange 4 which forms two skeleton arms 5, 6, projecting from opposite sides of the hub and forming with the hub an integral oblong member with the hub in the middle. The friction member comprises a flat plate ring 7 which is mounted on the hub against one side of the flange. Friction rings 8 are fastened to the plate at and adjacent its periphery and on opposite sides thereof. A casing 9 of angular form has a peripheral flange 10 arranged to lie against the plate ring 7 and to which it is secured by rivets 11 or other suitable fastening devices. The casing also has a centrally disposed flange 12 which lies alongside the hub 3. The casing forms a chamber adjacent each side of the hub member to receive a cushion strip 13, which can be made of rubber or other suitable compressible flexible material. The two cushion strips 13 extend along the sides and throughout the length of the hub member and they are confined snugly between the sides of the hub member and the casing 9 and the plate 7. The plate and the casing overlie the flange of the hub member and fit snugly on the hub without binding, to permit relative movement of the hub member and the friction member freely while at the same time excluding dirt and other foreign matter. I may make the cushion strips of rubber or rubber composition with or without cords or fabric or other binding material embedded therein, as may be found desirable to satisfy different conditions the cushion strips are of greater length than the diameter of the hub and are substantially as long as the hub member.

My invention provides a flexible cushion between the friction driving member and the hub driven member of the driven plate through which cushion movement of the driving member is communicated to the driven member. This cushion comprises the two separate and independent strips which are straight and elongated and are confined snugly in the chamber formed between the oblong shaped flange of the hub member and the plate and casing of the friction member. When the friction member is clamped in a friction clutch to communicate movement from one part to another in a forward direction opposite ends of the cushion strips are placed under compression between the plate and casing of the friction member and the flange of the hub member. These strips are confined in their chambers so that they cannot escape therefrom and when the strips are compressed as before stated the flow of the material of the strips will be wholly confined within the chambers. This flow of material is principally lengthwise of the strips which enhances their efficiency as a cushion between the two members of the driven plate. The cushion strips are subjected to compression only in service of the driven plate and are never subjected to tension whereby the life of the cushion is materially prolonged. When the friction member is caused to revolve in the direction indicated by the arrow in Fig. 1 the cushion strips will be placed under compression at the ends thereof indicated by $c, c$ on the casing and to an extent depending upon the resistance offered by the hub member. This will produce a narrowing of the cushion strip chambers at the ends indicated by $c, c$ and a corresponding widening of the chambers at the opposite ends which will accommodate the flow of the cushion material. If the direction of revolution of the friction member of the driven plate is reversed the other ends of the cushion strips will be compressed instead of those indicated by $c, c$, as will be readily understood. The driven plate is particularly adapted for friction clutches for automotive vehicles and while the clutch is in service the cushion strips are, to a more or less extent, constantly being worked as hereinbefore indicated which keeps the cushions alive, especially if they are made of rubber, and preserves their efficiency.

The drive through the driven plate passes from the friction member through two oppositely disposed straight cushion strips to the hub member acting on opposite sides of the hub and all engine noises due to vibration or other causes which would ordinarily be translated from the engine to the transmission of an automotive vehicle, if the driven plate were rigid or made up of rigidly connected parts, are absorbed by the cushions and are prevented from travelling to the transmission where they do or may become audible and objectionable. The cushion strips are not connected to any of the parts of the driven plate and they are arranged to work freely in their chambers on opposite sides of the hub member. The driven plate is light in weight and the construction is such that spinning movement is materially reduced which facilitates gear shifting. The ring 7 of the friction member is a flat plate, circular in shape and provided with a centrally disposed opening to receive the hub; and the casing 9, as well as the plate ring, may be stamped from sheet metal.

I claim:

1. A driven plate for friction clutches comprising a hub member, a friction member loosely mounted on the hub member and comprising a plate ring and a casing fastened to the plate ring and forming two elongated and substantially parallel chambers at opposite sides of the hub member, and cushion strips in said chambers.

2. A driven plate for friction clutches comprising a member having a hub, a friction member comprising a plate ring loosely mounted on the hub and an angular casing fastened to the ring and having a flange to loosely receive the hub, said casing being shaped to provide with the plate ring and the hub member two elongated and substantially parallel chambers at opposite sides of the hub member, and cushion strips being of greater length than the diameter of the hub and substantially as long as the hub member.

3. A driven plate for friction clutches comprising a centrally disposed hub and a flange integral with the hub and forming two oppositely disposed skeleton arms forming with the hub a substantially oblong hub member, a friction member loosely mounted on the hub member and having two elongated and substantially parallel chambers located along the elongated sides of the hub member, and a continuous independent rubber cushion strip arranged in each of said chambers and adapted to be compressed by the hub member and the friction member.

4. A driven plate for friction clutches comprising a centrally disposed hub having two oppositely projecting arms and forming a substantially oblong hub member, a friction member comprising a plate ring loosely mounted on the hub member on one side of said arms, a casing fastened to the plate ring and overlapping said arms and having a central opening and a circular flange therearound to receive the hub on the opposite side of the arms, said casing being shaped to form with the plate ring and the hub member two elongated and substantially parallel chambers at opposite sides of the hub member and cushions arranged in said chambers.

5. A driven plate for friction clutches comprising a hub member, a friction member loosely mounted on the hub member, and two substantially parallel and unconnected cushion strips arranged on opposite sides of the hub member and interposed between the hub member and the friction member, said cushion strips being of greater length than the diameter of the hub and substantially as long as the hub member, there being chambers formed by the hub member and the friction member which receive and confine the cushion strips and permit the material to flow endwise of said strips under compression action of the driven plate while it is in service.

6. A driven plate for friction clutches comprising a hub member and a friction member loosely mounted on the hub member, said hub member comprising a centrally disposed hub and oppositely projecting arms forming with the hub a substantially oblong hub member, an independent cushion strip arranged between each elongated side of the hub member and the friction member, and means for permitting said cushion strips to be placed under compression and preventing said cushion strips from being placed under tension.

HAROLD V. REED.